Oct. 7, 1969   D. E. SMITH   3,471,772
INSTRUMENT FOR MEASURING THE RANGE AND APPROXIMATE SIZE OF
BURIED OR HIDDEN METAL OBJECTS
Filed May 2, 1967   3 Sheets-Sheet 3
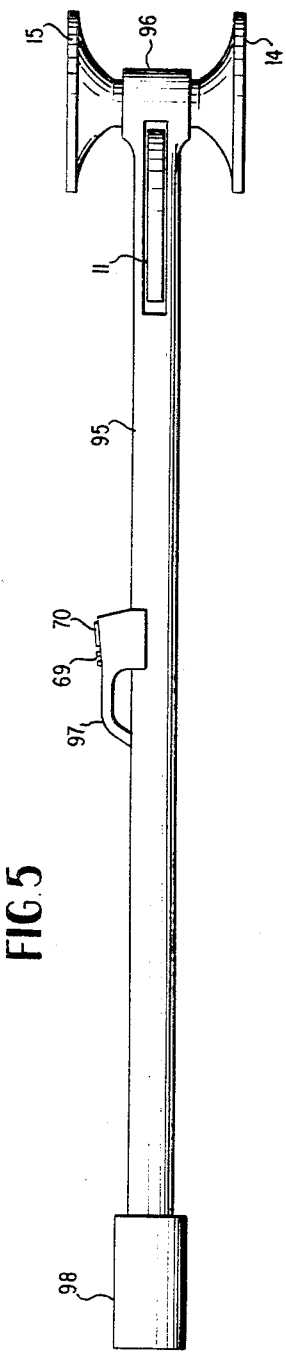
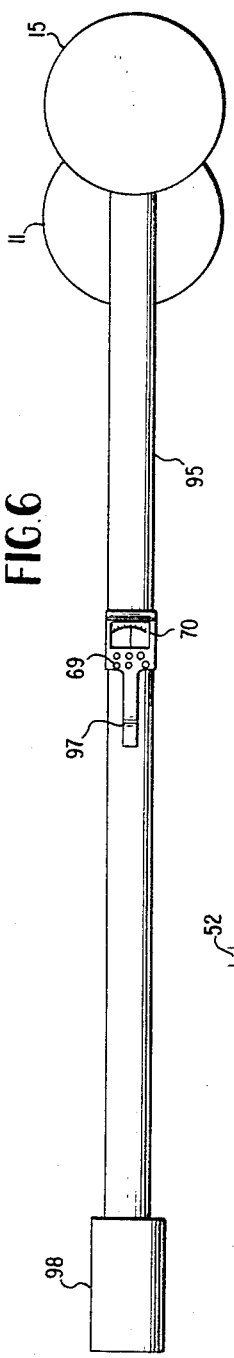
INVENTOR
DON E. SMITH
BY Brady, O'Boyle & Gates
ATTORNEYS United States Patent Office 3,471,772
Patented Oct. 7, 1969

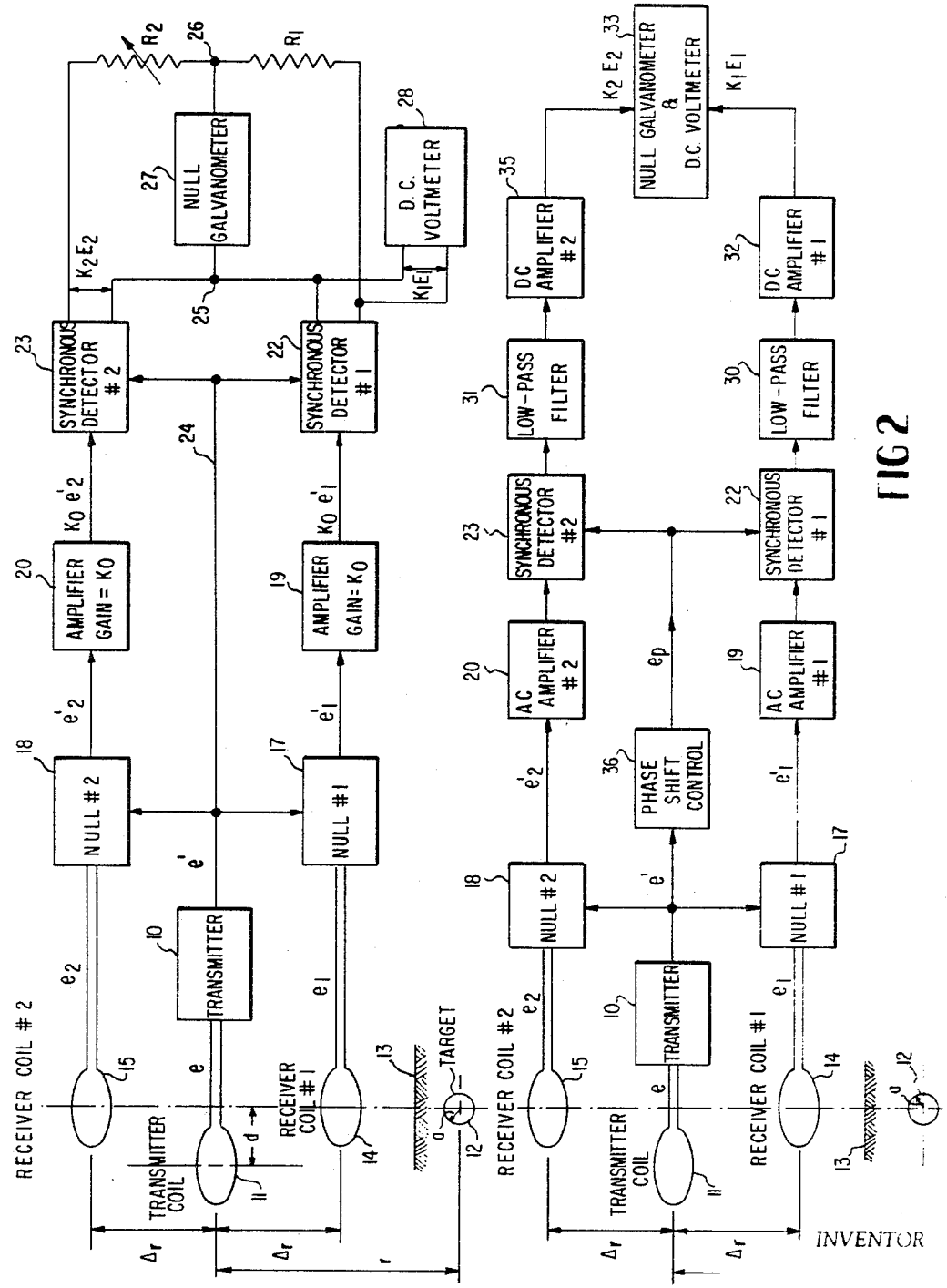

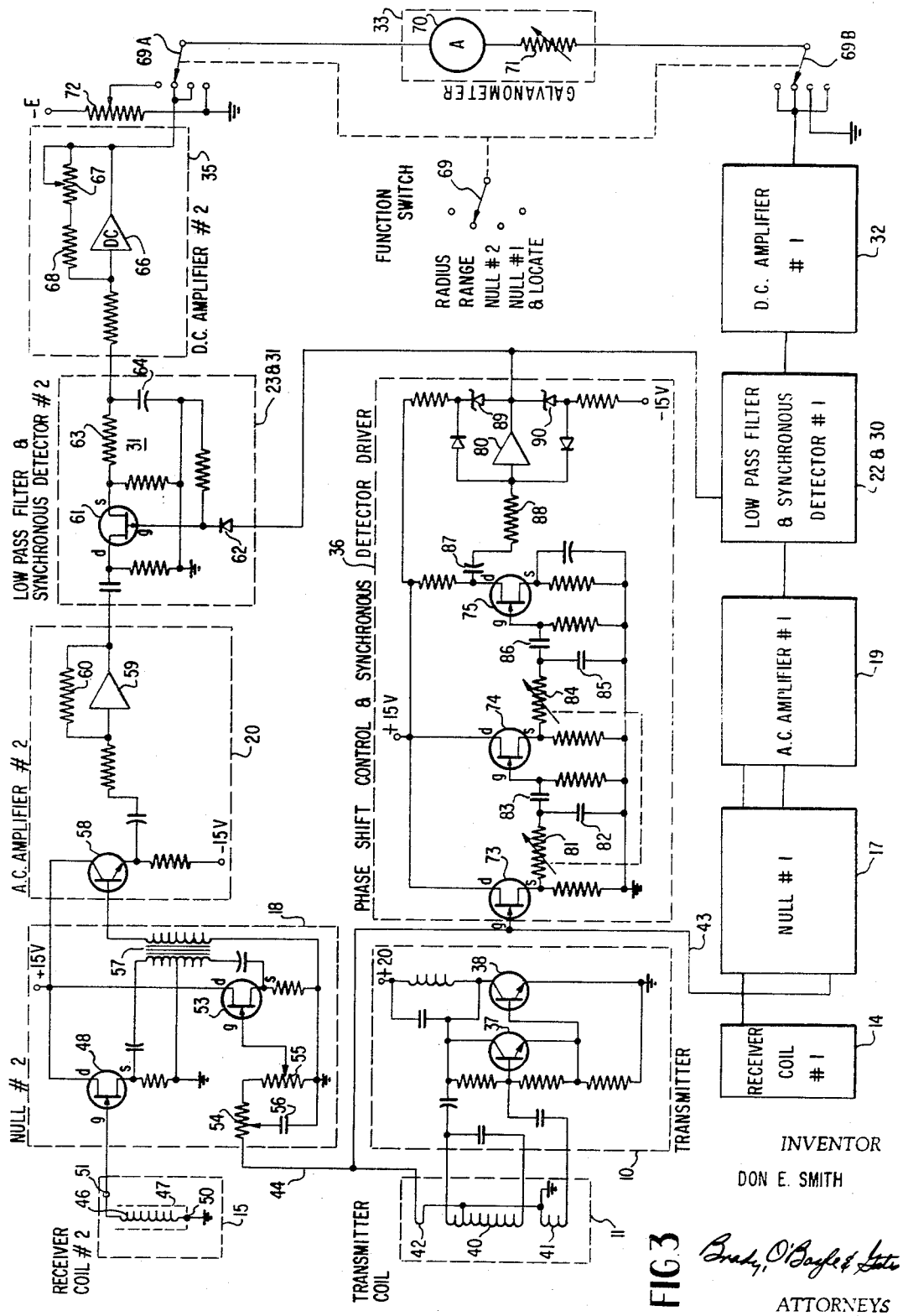

3,471,772
INSTRUMENT FOR MEASURING THE RANGE AND APPROXIMATE SIZE OF BURIED OR HIDDEN METAL OBJECTS
Don E. Smith, Port Matilda, Pa., assignor to HRB-Singer, Inc., State College, Pa., a corporation of Delaware
Filed May 2, 1967, Ser. No. 635,475
Int. Cl. G01v 3/08
U.S. Cl. 324—3            9 Claims

ABSTRACT OF THE DISCLOSURE

This invention describes apparatus for detecting and measuring the range and approximate size of buried or otherwise inaccessible metallic objects utilizing the active near-field phenomenon in a magnetic sensor system in combination with electronic circuitry for processing the sensor data to provide desired information indicative of the desired range and size.

BACKGROUND OF THE INVENTION

The present invention relates to metal locators in general and in particular to an instrument for measuring the range and approximate size of buried or otherwise inaccessible metallic objects. While prior art apparatus is known utilizing magnetic fields for locating or detecting metallic objects, detection was the only capability of the apparatus. Range and size of the hidden object was unavailable and a survey had to be made in the vicinity of the hidden object. From this data, a survey was then used to arrive at an estimate of the object's size. It is a well known fact that alternating electromagnetic fields from a transmitting or primary winding induce eddy currents in any conducting body which they permeate. By utilizing suitable receiver or secondary windings, magnetic fields can be induced in these secondary windings due to the eddy current produced by the primary winding. If a suitable indicating instrument is operatively connected to the secondary coils, it is possible to determine the fact that a conducting body is located nearby by the deflections of the indicating instrument when such secondary fields caused by the eddy currents links the second coils.

One such system is U.S. Patent 3,020,470 issued to E. N. Shawhan et al. wherein a primary winding is energized from a source of alternating current and two overlapping secondary windings, one of which is more closely coupled to the primary coil than the other, is utilized. The two secondary coils have the output voltages induced therein by the primary coil connected in mutual opposition to a network which is provided with means whereby the phases and magnitudes of the output voltages of the two coils may be substantially balanced. Because of the difference in coupling between each of the secondary coils and the primary coil, the induced secondary field which emanates from a submerged metallic body will link both secondary coils in a manner to produce addition of the voltages induced therein by the secondary field. The configuration claimed in the Shawhan patent consists of a concentric pair of secondary receiver coils one of which is more closely coupled to the source or transmitter coil and one of which is located on one side of the null pick-up position while the other is located on the opposite side of the null pick-up position. The induced signal in one receiver coil is used to null that which is induced in the opposite receiver coil to produce an indication of the presence of a submerged object. Because of the fact that one induced voltage is nulled against the other, it is inherently impossible to determine the range and approximate size of the object.

SUMMARY OF THE INVENTION

The subject invention comprises an instrument which is adapted to display range directly as well as providing information about the approximate size of the hidden object and includes a transmitter coil coupled to and powered by a transmitter of a relatively low frequency. A pair of receiver coils having their axes coincident so that they are concentric with one another are located equidistantly above and below the transmitter coil and slightly offset from the axis thereof. The transmitter coil induces an eddy current in the buried metallic object. The eddy current in the metallic object induces a voltage in each of the receiver coils when placced in proximity thereto. Each receiver coil is coupled to electronic circuitry which includes means for nulling the effect of the transmitter coil and providing a respective output voltage which is a function only of the induced voltage from the eddy currents in the hidden object. Circuit means are additionally included for obtaining the ratio of the induced voltages to provide a measure of the range to the hidden object due to the physical configuration of the transmitting and receiving coils. By determining the range of the hidden object, the approximate size of the object can further be determined by measuring the induced voltage in one of the receiver coils, for example, the receiver coil closest to the hidden object which would be the coil nearest the ground plane.

BRIEF DESCRIPTION OF THE DRAWINGS

FIGURE 1 is a block diagram of a first embodiment of the subject invention including an illustration of the relative position of the transmitter and receiver coils;

FIGURE 2 is a block diagram of a second and preferred embodiment of the subject invention also illustrating the arrangement of the transmitter and receiver coils shown in FIGURE 1;

FIGURE 3 is an electrical schematic diagram of the embodiment shown in FIGURE 2;

FIGURE 4 is a plan view of the wiring configuration of the receiver coils utilized by the subject invention;

FIGURE 5 is a side elevational view of a physical embodiment of the subject invention; and FIGURE 6 is a plan view of the physical embodiment illustrated in FIGURE 5.

DESCRIPTION OF THE PREFERRED EMBODIMENTS

Referring now to FIGURE 1, a low frequency transmitter 10 is coupled to a transmitting coil 11 which is of a substantially circular configuration. The transmitting coil 11 is located near but offset from a target 12 being separated a lateral distance $d$ and a vertical distance $r$ therefrom. The target 12, moreover, is shown for purposes of illustration as being spherical in shape and having a diameter of $a$. The target 12 is shown buried beneath the surface of the ground with the ground plane being illustrated by reference numeral 13. A pair of receiver coils 14 and 15 are respectively located below and above the transmitter coil 11 by a distance of $\Delta r$. The axes of the receiver coils 14 and 15 are coincident with one another and the target 12 and are offset, therefore, from the axis of the transmitter coil 11 by the distance $d$. This is shown for purposes of illustration only for it should be realized that the figure could have been drawn with the axis of the transmitter coil 11 located over the target 12 or the target could have been located in any desired manner with respect to the transmitter and receiver coils. What is significant, however, is that the receiver coils are equidistant from the transmitter coil by a distance $\Delta r$ and the transmitter coil 11 is positioned substantially parallel to the ground plane 13.

Both receiver coils 14 and 15 are respectively coupled to null circuits #1 and #2 designated by reference numerals 17 and 18. The #1 null circuit 17 is coupled to an amplifier 19 having a gain of $K_0$. Likewise, the #2 null circuit is coupled to a similar amplifier 20 also having a gain of $K_0$. Both amplifiers 19 and 20 are respectively coupled to a synchronous detector 22 and 23. Both synchronous detectors 22 and 23 receive an input signal from the transmitter 10 by means of the circuit lead 24. The output circuits, not shown, of the synchronous detectors 22 and 23 comprise legs of a bridge circuit in combination with the fixed resistor $R_1$ and the variable resistor $R_2$. The synchronous detectors have a common terminal 25 and the resistors $R_1$ and $R_2$ have a common terminal 26 providing bridge output terminals thereby. A null galvanometer 27 is coupled across terminals 25 and 26 for providing an indication of a bridge balance condition. A DC voltmeter 28 is adapted to be coupled across the output of the synchronous detector 22 such that one terminal of the voltmeter 28 is common to terminal 25 while the opposite terminal is common to the end of resistor $R_1$ which is coupled to the synchronous detector 22.

In operation, the transmitter 10 supplies alternating current to the transmitter coil 11 by means of the voltage $e$. The current in the coil 11 induces an eddy current in the metallic object or target 12. The eddy current in turn induces a voltage $e_1$ in the first receiver coil 14. From the geometry of the receiver coil, the target voltage $e_1$ induced in the receiver coil 14 is expressed by the equation:

$$e_1 = \frac{-\mu_0 w A_R N_T A_T I_T M}{4\pi r^3 (r-\Delta r)^3} \quad (1)$$

where:

$u_0$ = permeability of the medium,
$w$ = transmitter angular frequency,
$A_R$ = receiver coil area,
$N_R$ = turns in receiver coil,
$N_T$ = turns in transmitting coil,
$A_T$ = transmitter coil area,
$I_T$ = current in transmitting coil,
$M$ = induced magnetic dipole moment coefficient of the spherical target,
$r$ = distance from transmitting coil to target,
$\Delta r$ = distance between transmitting coil and receiving coil.

Providing no ferrous metal is used in the construction of the search head, the induced voltage in the second receiver coil 15 in turn can be expressed by the equation:

$$e_2 = \frac{-\mu_0 \omega A_R N_R N_T A_T I_T M}{4\pi (r+\Delta r)^3} \quad (2)$$

The ratio of the Equations 1 and 2 is expressed as:

$$e_1/e_2 = \left(\frac{r+\Delta r}{r-\Delta r}\right)^3 \quad (3)$$

from which, $$r = \frac{[(e_1/e_2)^{1/3}+1]}{[(e_1/e_2)^{1/3}-1]} \Delta r \quad (4)$$

The receiver coil #1 which is identified by reference numeral 14 is coupled to the first null circuit 17 so that the signal $e_1$ is applied to the input thereof; however, the nulling circuit also receives a signal $e'$ from the transmitter 10. The purpose of the nulling circuit 17 is to null that voltage which is induced in the receiver coil 14 directly from the transmitter coil 11. This null operation can be achieved by a manual control or it may consist of an automatic null servo circuit. The output of the null circuit 17 comprises the signal $e_1'$ indicative of the fact that the signal consists entirely of the voltage produced by the eddy currents in the target 12. The signal $e_1'$ is applied to the AC amplifier circuit 19 having a gain of $K_0$ providing an output signal of $K_0 e_1'$. This amplified signal is then coupled to the synchronous detector 22 which also receives an input from the transmitter 10 in the form of signal $e'$. The synchronous detector is a well known circuit to those skilled in the art and when desirable is sensitive only to signals at or near a given frequency. This frequency is identical with the frequency of a control signal supplied independently which, in this case, is the signal $e'$. It is also well known that synchronous detectors are used in bridge and other null circuits as anti-noise devices. The output of the synchronous detector 22, then, is a DC signal of a magnitude $Ke_1$.

The same configuration is repeated for the second receiver coil 15 wherein a second null circuit 18 is coupled to the amplifier 20 providing outputs, respectively of $e_2'$ and $K_0 e_2'$. A second synchronous detector 23 receives the output of the amplifier 20 providing a direct current signal having a magnitude of $Ke_2$. Since the synchronous detectors 22 and 23 form part of a bridge circuit including resistors $R_1$ and $R_2$, when resistor $R_2$ is adjusted such that the null galvanometer 27 indicates a bridge null is occurring, the target range $r$ can be stated in view of Equation 4 as:

$$r = \frac{[(R_1/R_2)^{1/3}+1]}{[(R_1/R_2)^{1/3}-1]} \Delta r \quad (5)$$

The scale of resistor $R_2$ can, when desirable, be calibrated directly in range according to the above-stated relationship. The DC voltmeter 28 presents a direct reading of the output of the synchronous detector 22 which is the signal voltage $Ke_1$. With this information, the effective radius $a$ of the target 12 can be derived as follows:

Rearranging Equation 1 and inserting $e_1'$ for $e_1$ provides the expression:

$$M = \frac{4\pi e_1' r^3 (r-\Delta r)^3}{\mu_0 \omega A_R N_R A_T N_T I_T} \quad (6)$$

Equation 6 can be simplified and written as:

$$M = K e_1' r^3 (r=\Delta r)^3 \quad (7)$$

where $K_1$ is an instrumentation constant depending upon the design of the particular instrument.

For Copper, Brass, Gold, Silver and Aluminum targets, it has been observed that $M=a^3$. For iron or steel targets, $M \approx 2a^3$. Using these relations for M in Equation 7 provides an expression for the radius of a spherical target $a$ of:

$$a = K_1 e_1'^{1/3} r(-\Delta r) \quad (8)$$

for the first group of targets and $$a = 0.79 K_1 e_1'^{1/3} r(r-\Delta r) \quad (9)$$

Equations 8 and 9 suggest that if range can be measured according to Equation 5, explained above, and the target voltage induced in the receiver coil 14 can be measured, then the effective radius of the target $a$ can be computed. If the target material is unknown, the effective target radius calculation could be in error by about 20%. Aside from this source of error, the calculation error can be approximated by employing of logarithmic differentiation to produce the following expression:

$$\epsilon_a = \frac{100}{3} \frac{de_1}{e_1} + \left(\frac{2r-\Delta r}{r-\Delta r}\right) 100 \frac{dr}{r} \quad (10)$$

where $\epsilon_a$ is the percent of error in computing the target radius A. The first term of this equation can be neglected in comparison to the second term. Also, the locator is designed such that $r \gg \Delta r$, thus $$\epsilon_a \approx 2\epsilon_r \quad (11)$$

This shows that providing the target voltage ratio can be measured to within one percent ($\epsilon_r$ max=5%), the effective target radius can be computed to within ten percent if the target material is known or to within thirty percent if it is unknown.

FIGURE 2 is a block diagram illustrative of a second embodiment of the subject invention and is similar to the first embodiment shown in FIGURE 1 with the exception that the bridge circuit arrangement is eliminated and the synchronous detectors 22 and 23 are coupled into low pass filters 30 and 31, respectively. The low pass filter 30 is coupled to a DC amplifier 32 and provides a DC output voltage of $K_1E_1$ which is fed to a combination null galvanometer and DC voltmeter circuit 33. The output of the low pass filter 31, likewise, is coupled to a second DC amplifier 35 which provides an output of $K_2E_2$ which in turn is applied to the null galvanometer circuit 33 as another input. Additionally, the transmitter 10 couples the voltage $e_1$ into a phase shift control circuit 36 which supplies a signal $e_p$ to the synchronous detectors 22 and 23. It is well known to those skilled in the art that a synchronous detector when desirable can be made phase sensitive. In the embodiment shown in FIGURE 1, the synchronous detectors 22 and 23 are operated as frequency sensitive devices; however, in the embodiment shown in FIGURE 2, the synchronous detectors 22 and 23 are operated as phase sensitive circuits. The inclusion of the phase shift control circuit 36 is accordingly desired.

An electrical schematic diagram of the embodiment shown in FIGURE 2 is disclosed in FIGURE 3. Referring now to FIGURE 3, the transmitter 10 is shown comprising a tuned-collector oscillator employing a pair of n-p-n transistors 37 and 38. The transmitter coil 11 comprises a portion of the feedback circuit from the collectors of transistors 37 and 38 to the base of transistor 37. The transmitter coil 11 includes three coil elements 40, 41 and 42. The coil element 40 is tapped and grounded thereat with the extremities capacitively coupled to the collectors of transistors 37 and 38. Coil element 41 is magnetically coupled to the first coil element 40 and has one end connected to ground while the opposite end thereof is capacitively coupled back to the base of transistor 37. The third coil element 42 is also magnetically coupled to coil element 40 and is connected to the null circuits 17 and 18 and the phase shift control circuit 36 by means of circuit leads 43 and 44. The receiver coils 14 and 15 are identical and are shown schematically as a coil 46 partially shielded by means of a shield 47. One end of the coil 46 is connected to ground at terminal 50 while the opposite end is connected to the gate electrode of a field effect transistor 48 in the #2 null circuit 18 by means of terminal 51.

The receiving coils 14 and 15 are shown in detail in FIGURE 4. Referring to FIGURE 4, receiver coil 46 is shown comprising a plurality of turns, for example 1000 turns, of circularly wound wire which is bonded with an epoxy resin and terminating in terminals 50 and 51. The shield 47 embodies a Faraday shield and comprises a single layer of wire toroidally wound about the receiver coil with the midpoint connected to terminal 50 while the other extremity illustrated by reference numeral 52 is open circuited. It is well known to those skilled in the art that a Faraday shield is an electrostatic shield comprising a series of parallel wires connected at one end with the common point being grounded. The Faraday shield is characterized by the fact that electromagnetic waves are not influenced thereby.

Referring back now to FIGURE 3, attention is directed more particularly to the #2 nulling circuit 18 wherein the receiver coil 15 is coupled to the gate of the field effect transistor 48. Coil element 42 of the transmitter coil 11 is coupled to the gate of another field effect transistor 53 in the nulling circuit 18 by means of the circuit lead 44 and the potentiometer resistors 54 and 55. Capacitor 56 is coupled to the wiper of potentiometer 54 and then to ground for providing a bypass circuit for undesirable signals. The nulling operation of cancelling the transmitter's induced signal directly into the receiver coil 15 is accomplished by coupling the source electrode of field effect transistors 48 and 53 to opposite ends of the primary winding of transformer 57. The primary winding is center tapped and connected to ground. By selective adjustment of variable resistors 54 and 55, the suitable cancellation or nulling can be achieved in the primary winding with the desired signal from the target being induced in the secondary winding. This signal is coupled to the base of n-p-n transistor 58 of the AC amplifier #2 identified by reference numeral 20. The transistor 58 is connected in an emitter follower circuit configuration which is well known to those skilled in the art and has for its purpose the matching of the input impedance of the amplifier 59 to the transformer 57. The amplifier 59 can be of any desired configuration and is therefore shown in block diagrammatic form. A feedback resistor 60 is included from output to input for providing feedback stabilization for the signal being amplified. The output of the amplifier 59 is capacitively coupled to the synchronous detector 23 including the field effect transistor 61. The gate of field effect transistor 61 is coupled to the output of the phase shift control and synchronous detector driver circuitry 36 by means of a diode 62. The output of the synchronous detector which appears at the source electrode of field effect transistor 61 is coupled to the low pass filter 31 comprised of resistor 63 and capacitor 64. The output of the synchronous detector, moreover, is substantially a DC voltage; however, some noise might be present. The low pass filter merely insures that further noise signals of a relatively higher frequency nature will be bypassed to ground. The output of the low pass filter 31 which appears at the common connection between the resistor 63 and the capacitor 64 is coupled into the DC amplifier means 35. The DC amplifier 35 comprises an amplifier 66 having an adjustable feedback circuit comprising variable resistor 67 and resistor 68. The output of the DC amplifier 66 is coupled to the second contact of the first section 69A of a four-position two-gang "function switch" 69. The wiper of section 69A is coupled to one terminal of the galvanometer circuit 33 comprising a microampmeter 70 connected in series with a variable resistance 71 which is a means for providing an adjustment for galvanometer sensitivity. The first contact of the switch section 69A is coupled to the wiper arm of a potentiometer 72 which has one end connected to a source of potential $-E$ while the opposite end is coupled to ground. The third contact of the switch section 69A is commonly connected to the second contact which is common to the output of the DC amplifier 66. The fourth contact is coupled to ground.

Similar circuitry exists for the components disclosing the first receiver coil 14 through to the first DC amplifier 32. The output of the DC amplifier 32, however, is connected to the first, second and fourth contacts of the second switch section 69B. The third contact of the switch section 69B is connected to ground while the wiper is coupled to the opposite input to the galvanometer 33 which is common to the variable resistor 71.

The phase shift control circuitry 36 comprises three field effect transistors 73, 74 and 75 and a synchronous detector driver amplifier 80 and associated circuitry. The transmitter 10 is coupled to the phase shift control circuit by means of the transmitter coil portion 42. The gate electrode of field effect transistor 73 is connected to coil portion 42 by means of circuit lead 43. A first phase shift network comprising variable resistor 81 and capacitor 82 is coupled to the source electrode of field effect transistor 73 with the shifted signal being capacitively coupled to the gate electrode of field effect transistor 74 through the capacitor 83. A second phase shift circuit is coupled to the source electrode of field effect transistor 74 and comprises variable resistor 84 and capacitor 85. The variable resistors 81 and 84, moreover, are mechanically ganged together. The signal is further shifted in phase and is capacitively coupled to field effect transistor 75 by means of capacitor 86. A stage of amplification is provided by field effect transistor 75. The signal is capacitively coupled to the driver amplifier 80 via the drain electrode of transistor 75 and capacitor 87 and resistor 88. The output of the driver amplifier 80 is clamped at a predetermined voltage between $-15$ volts and $-15$ volts by means of the Zener diodes 89 and 90.

The operation of the second embodiment shown in FIGURES 2 and 3 is similar to that explained with respect to the first embodiment shown in FIGURE 1. The search head configuration is the same. Each receiver coil 14 and 15 is connected to a respective nulling circuit 17 and 18 where the directly induced transmitter signal $e$ is nulled by summing with a transmitter signal of opposite polarity in the primary of transformer 57 which has its center tap returned to ground. The adjustment of the amplitude of the transmitter signal $e$ coupled from the transmitter coil is as has been noted by means of variable resistors 54 and 55. From each null circuit 17 and 18, the signal is amplified in a fixed gain AC amplifier 19 and 20 and then is coupled to a respective synchronous detector 22 and 23. In the present embodiment, however, a signal from the transmitter $e'$ is coupled to the phase shift circuit 36 which appears as signal $e_p$ when applied to the synchronous detectors. The phase shift control is adjusted so that maximum signal appears at the output of each synchronous detector 22 and 23. These outputs are then fed through low pass filters 30 and 31 to a respective DC amplifier 32 and 35, The output of each DC amplifier 32 and 35, $K_1E_1$ and $K_2E_2$, is then compared in the null galvanometer 33 and the DC output $K_1E_1$ of DC amplifier #1 which is identified by reference numeral 32 is measured by utilizing the null galvanometer 33 which is then adapted to operate as a DC voltmeter. Such an adaptation is well known to those skilled in the art. The total gain for the signal channel including DC amplifier 32 is $K_1$. Likewise, the total gain of the composite circuitry from the receiver coil to the output of the DC amplifier 35 is $K_2$.

An operator utilizing the apparatus begins by adjusting each null control in Null circuits 17 and 18 by first switching the function switch 69 to position "null #1 and Locate" and then to "null #2" and each time adjusting the null control potentiometers 54 and 55 so that a minimum output is measured by the meter 70 while the instrument is rendered non-responsive to any target signals. The target 12 is then approached and the function switch 69 is switched to the "null #1 and locate" position and the phase shift control comprising variable resistors 81 and 84 are adjusted and position of the instrument is varied until a maximum reading appears on the meter 70 which in the instant position is operating as a DC voltmeter. This voltage magnitude is noted as $E_1$. The function switch 69 is then switched to the "range" position and the gain of DC amplifier 35 is adjusted by means of the variable resistor 67 until a null occurs on the meter 70 which is now acting as a galvanometer. The voltage out of the DC amplifier 35 is then $K_2E_2$. $K_1E_1$ is then equal to $K_2E_2$.

At this point, the ratio of the receiver coil's target voltage $e_1$ and $e_2$ is:

$$e_1/e_2 = K_2/K_1 \quad (12)$$

while the magnitude of the target voltage out of receiver coil #1 and identified as reference numeral is:

$$e_1 = E_1/K_1 \quad (13)$$

Range to the target $r$ is then calculated by substituting Equation 12 into Equation 4:

$$r = \left[\frac{(K_2/K_1)^{1/3}+1}{(K_2/K_1)^{1/3}-1}\right]\Delta r \quad (14)$$

The effective target radius $a$ is calculated by substituting Equation 13 into Equation 8 to yield:

$$a = K_0 E_1^{1/3} r(r - \Delta r) \quad (15)$$

where $K_0$ is a locator constant. Also, with the function switch 69 in the "radius" position, and adjusting potentiometer 72 until the meter 70 is nulled, $E_1$ of Equation 15 becomes:

$$E_1 = Q_3 E \quad (16)$$

where $Q_3$ is the fraction of the total resistance of resistance 72 or voltage down from $-E$ selected.

FIGURES 5 and 6 disclose side elevational and plan views of a physical embodiment of the subject invention wherein the transmitter coil 11 and receiver coils 14 and 15 are located at one end of an elongated tubular member 95. The receiver coils 14 and 15 are shown being located at the extremity of the tubular member being disposed on opposite sides of a hub 96. The transmitter coil 11 is located inwardly of the receiver coils 14 and 15 and is shown being axially offset from the central axis of the concentric receiver coils. Intermediate the ends of the tubular member 95 is located a handle portion 97 which is adapted to include the meter 70 and the function switch 69. At the opposite end of the tubular member 95 is a housing 98 which is adapted to include the electronic circuitry disclosed with respect to the contemplated embodiments. The apparatus is adapted to be carried in such a manner that the transmitter and receiver coils can be carried and operated such that it is oriented substantially parallel to the surface of the ground. Also, it should be observed that the tubular member 95 is a relatively elongated member with the housing for the electronic circuitry being located at the end opposite the coils such that sufficient isolation exists so that there is little or no side effects on the circuitry due to the magnetic fields present.

What has been shown and described, therefore, is an electronic instrument capable of not only locating buried or hidden metallic objects but is capable of determining not only the range of the object from the instrument but also its approximate size. While there has been shown and described what is at present considered to be the preferred embodiments of the invention, modifications thereto will readily occur to those skilled in the art. It is not desired therefore that the invention be limited to the specific arrangements shown and described but it is to be understood that all equivalents, alterations, and modifications within the spirit and scope of the invention are herein meant to be included.

I claim:

1. Apparatus for determining the location, range and size of a buried or otherwise hidden metallic object beneath a ground plane comprising, in combination:

transmitter means including an oscillator comprising a first and a second transistor, each having a base, an emitter, and a collector, first circuit means commonly coupling the collector of the first transistor to the collector of the second transistor, second circuit means coupling the emitter of the first transistor to the base of said second transistor, third circuit means coupling the emitter of said second transistor and the collectors of said first and second transistors across a supply potential, and being operable to provide an output signal $(e)$ of a predetermined frequency;

planar transmitter coil means having an axis and defining a first plane substantially parallel to the ground plane located an unknown range $(r)$ from said metallic object, coupled to said transmitter means and being responsive to said output signal $(e)$ for coupling magnetic flux lines to said metallic object and inducing an eddy current therein, said planar transmitter coil means including a first coil coupled to the collectors of said first and said second transistor and having a connection to a point of reference potential intermediate the end terminals thereof, a second coil having one end terminal coupled to said point of reference potential and the opposite end terminal thereof to the base of said first transistor, and a third coil having one end terminal thereof coupled to said point of reference potential;

a pair of coaxial planar receiver coils defining a second and a third plane substantially parallel to said first plane, above and below said transmitter coil, respectively, located in an axial offset relationship relative to the axis of said transmitter coil means, and each of said receiver coils having an equal planar separation from said transmitter coil means of a distance ($r$), said pair of receiver coils being substantially equally interlinked by flux lines from said transmitter coil means, said metallic object thereby inducing respective voltages ($e_1$) and ($e_2$) therein of like polarity;

a first and a second nulling circuit coupled to a respective coil of said pair of receiver coils and commonly to the third coil of said transmitter coil means, each nulling circuit including first semiconductor amplifier means coupled to said respective coil of said pair of receiver coils, a second semiconductor amplifier means coupled to the other end terminal of said third coil of said transmitter coil means and additionally including variable impedance means coupled therebetween for varying the amplitude of the signal from said third coil to the input of said second semiconductor amplifier means; and a nulling transformer having a primary and a secondary winding including circuit means for connecting the opposite end terminals of the primary winding respectively to the first and second semiconductor amplifier means and coupling said point of reference potential to substantially the midpoint of the primary winding, said first and second nulling circuit being responsive to the respective voltage induced therein and a voltage of selected magnitude from the third coil of said transmitter coil means for nulling the directly induced voltage in said pair of receiver coils from the transmitter coil and providing output voltages ($e_1'$) and ($e_2'$), from which the unknown range ($r$) is determined according to the equation:

$$r = \frac{[(e_1'/e_2')^{1/3}+1]}{[(e_1'/e_2')^{1/3}-1]} \Delta r$$

and the approximate diameter ($a$) of said metallic object is determined according to the equation:

$$a = K e_1'^{1/3} r(r - \Delta r)$$

where ($K$) is a predetermined constant related to the physical configuration of said transmitter coil means and said pair of receiver coils.

2. The apparatus as defined in claim 1 and additionally including first circuit means coupled to said first nulling circuit for providing a direct current signal ($K_1E_1$) from said signal ($e_1'$) and a second circuit means coupled to said second nulling circuit for providing a direct current signal ($K_2E_2$) from said signal ($e_2'$) from which the unknown range ($r$) is determined according to the equation:

$$r = \frac{[(K_2/K_1)^{1/3}+1]}{[(K_2/K_1)^{1/3}-1]} \Delta r$$

and the approximate diameter ($a$) of said metallic object is determined according to equation:

$$a = K_0 E_1^{1/3} r(r - \Delta r)$$

where ($K_0$) is a constant dependent on a physical configuration of said transmitter coil and said pair of receiver coils.

3. The apparatus as defined in claim 2 wherein said first and said second circuit means comprise a first and a second synchronous detector, respectively, including input means for receiving a signal of said predetermined frequency from said third coil of said transmitter coil means.

4. The apparatus as defined in claim 2 and additionally including a first and a second resistance $R_1$ and $R_2$ coupled to said first and said second circuit means in bridge circuit relationship therewith from which the unknown range ($r$) is determined according to the equation:

$$r = \frac{[(R_1/R_2)^{1/3}+1]}{[(R_1/R_2)^{1/3}-1]} \Delta r$$

and the approximate diameter ($a$) of said metallic object is determined according to the equation:

$$a = K_0 E_1^{1/3} r(r - \Delta r)$$

5. The apparatus as defined in claim 4 wherein said first and said second circuit means comprise first and second synchronous detectors.

6. The apparatus as defined in claim 2 wherein said first and said second circuit means comprise a first and a second synchronous detector and additionally including phase shift control circuit means coupled between said third coil of said transmitter coil means and said first and said second synchronous detector for providing a signal of a predetermined phase to said first and second synchronous detector.

7. The apparatus as defined in claim 1 wherein said transmitter means comprises a relatively low frequency transmitter.

8. The apparatus as defined in claim 2 and additionally comprising first and second DC amplifier means coupled to said first and second circuit means, respectively, and galvanometer means coupled across the outputs of said first and said second DC amplifier means for providing an indication of a null condition.

9. The apparatus as defined in claim 1 wherein said transmitter coil means and said pair of receiver coils comprise circular coils of substantially equal dimensions.

References Cited

UNITED STATES PATENTS

| | | | |
|---|---|---|---|
| 1,812,392 | 6/1931 | Fuschlag | 324—3 XR |
| 2,129,058 | 9/1938 | Hedden | 324—3 XR |
| 3,002,262 | 10/1961 | Demopoulos et al. | |
| 3,020,470 | 2/1962 | Shawhan et al. | 324—3 |
| 3,020,475 | 2/1962 | Walton | 324—3 XR |
| 3,051,892 | 8/1962 | Huston | 324—6 |
| 3,105,190 | 9/1963 | Norris | 324—6 |

GERHARD R. STRECKER, Primary Examiner